UNITED STATES PATENT OFFICE.

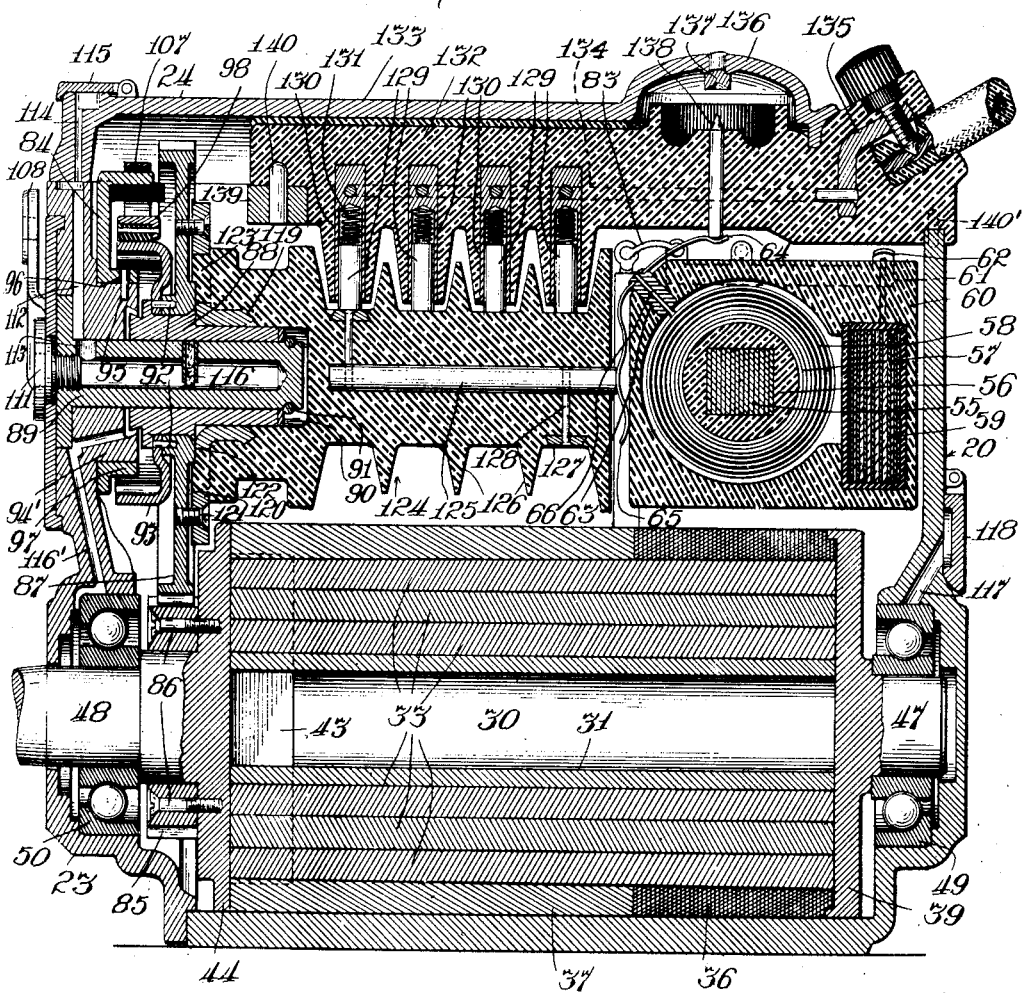

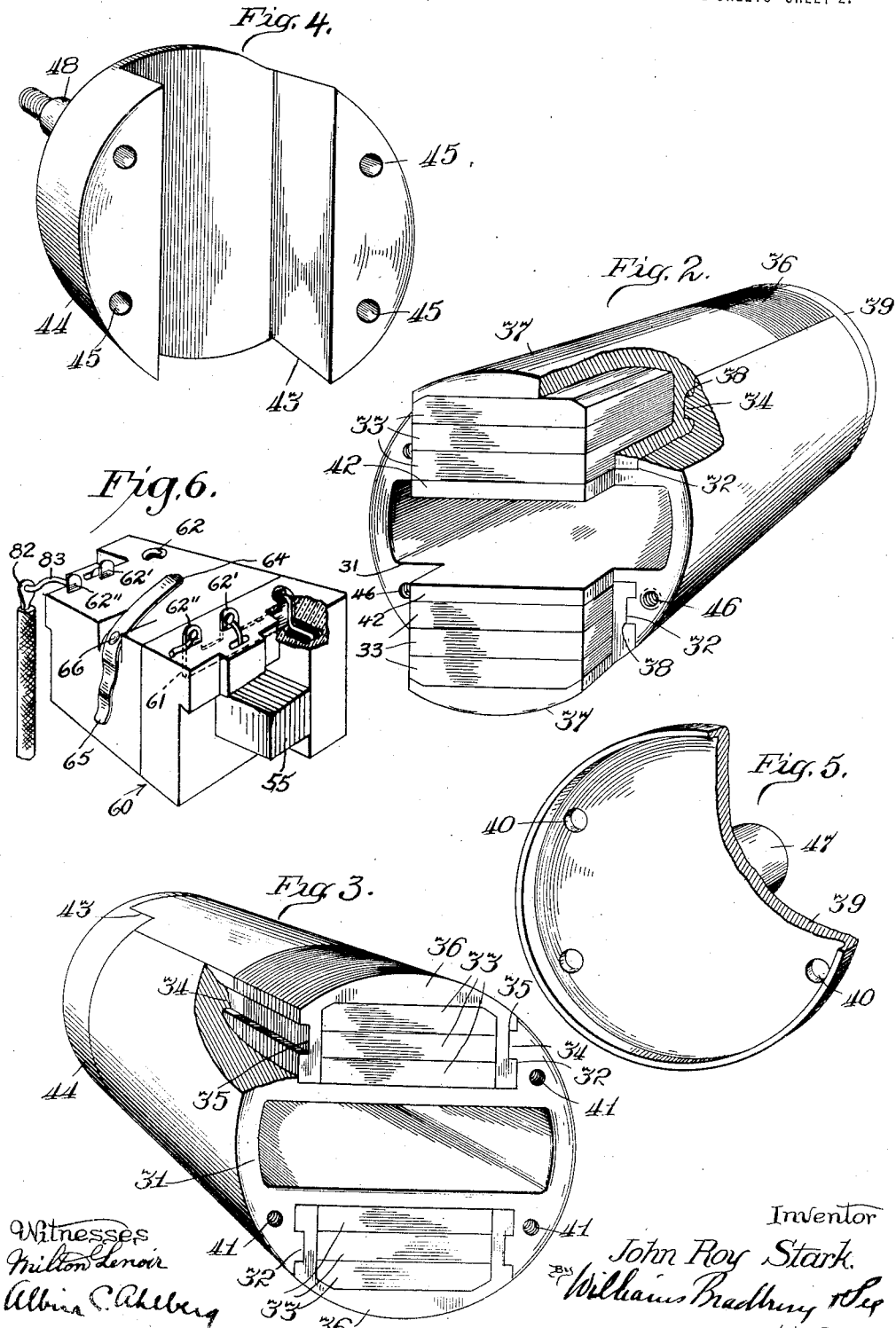

JOHN ROY STARK, OF RACINE, WISCONSIN, ASSIGNOR, BY MESNE ASSIGNMENTS, TO WEBSTER ELECTRIC COMPANY, OF RACINE, WISCONSIN, A CORPORATION OF WISCONSIN.

MAGNETO.

1,357,008.

Specification of Letters Patent.   Patented Oct. 26, 1920.

Application filed December 8, 1917.   Serial No. 206,151.

*To all whom it may concern:*

Be it known that I, JOHN ROY STARK, a citizen of the United States, residing at Racine, in the county of Racine and State of Wisconsin, have invented a certain new and useful Improvement in Magnetos, of which the following is a full, clear, concise, and exact description, reference being had to the accompanying drawings, forming a part of this specification.

This invention relates to improvements in magnetos, and is particularly concerned with that type of magneto in which a movable inductor is employed for quickly creating and reversing the flux in a field member which is in inductive relation with the generating winding. Certain features of my invention are, however, capable of being utilized or employed in connection with magnetos of other types. In commercial magnetos of the type to which I have referred it has heretofore been the general practice, so far as I am aware, to employ a field structure comprising a permanent magnet in combination with an inductor of soft iron for reversing the direction of the field with respect to a generating coil. Revolving permanent magnets have also been employed in connection with stationary generating coils, and it is one object of my invention to provide an improved magneto of this type. In my improved magneto I construct the field circuit or members of soft iron and employ a pivotally mounted permanent magnet for building up a flux in the field circuit and for suddenly reversing the direction of this flux. The magnet which constitutes the inductor is built up of a plurality of flat bar magnets arranged in sets with the poles of opposite polarity adjacent to or opposed to each other. One end of these two sets of magnets is secured in a head of magnetically permeable material such as soft iron, or it may be steel or cast iron, which is provided with a trunnion that acts as a pivotal support for the inductor.

Another feature of my invention resides in the field circuit which comprises a pair of pole pieces and a detachable yoke member which is surrounded by the primary and secondary coils. The primary and secondary coils are confined in an insulating casing, which likewise incloses the condenser. By making the yoke member detachable from the pole pieces it is comparatively easy to remove this yoke member with the attached generating coils for the purpose of repair or replacement, it being unnecessary to further disassemble the magneto.

A still further feature of my invention resides in the relative arrangement of the inductor, the distributer spool and brushes, and the generating coil, and also the relative arrangement of the interrupter mechanism with regard to the remaining elements.

In prior structures these parts have been so arranged that it is practically impossible to gain access to some of these several parts without practically dismantling the magneto. In my improved magneto I have so arranged these parts relative to one another that they all become accessible by merely removing a cover which forms a part of the magneto casing.

Some of the objects of my invention are then: to provide a magneto in which those elements which it is frequently necessary to inspect or replace in case of damage are easily accessible and removable without disturbing the remaining elements; and to so construct the field structure of the magneto that the generating coil or coils may be easily and quickly detached therefrom for the purpose of inspection or repair. A still further object is to produce a magneto in which the cost of the permanent magnet structure is reduced to a minimum.

Further objects will appear in the description of my improved magneto, reference being had to the accompanying drawings in which Figure 1 is a vertical central longitudinal section through the improved magneto of my invention;

Figs. 2, 3, 4 and 5 are perspective views of certain of the elements of my improved inductor; and Fig. 6 is a perspective view of what might be termed the generating unit, portions thereof being broken away to more clearly disclose the structure.

Similar characters of reference refer to similar parts throughout the several views.

Referring to the drawings, the reference character 20 indicates as a whole the casing which comprises a body member having four sides, namely, the bottom, the two side walls, and one end wall of the casing. Secured to the opposite end of the body member by screws is an end plate 23. The upper side of the casing is formed by a cover 24 which is held in place by means of spring catches (not shown). It is to be understood, however, that I may employ other means for securing the cover to the casing.

Referring now to Figs. 1 to 5, inclusive, the reference character 30 indicates as an entirety the inductor which comprises a hollow cylindrical core 31 having oppositely disposed longitudinal grooves 32 cut in the periphery thereof for receiving the bar magnets 33. In the drawings I have illustrated three of these bar magnets in each of the grooves, but it is to be understood that this number may either be increased or decreased as found desirable. The bar magnets in each of these sets are arranged with like poles adjacent each other, but the opposed or adjacent poles of the two sets are of opposite polarity.

From an inspection of Figs. 2 and 3 it will be seen that I have provided longitudinal ribs 34 on each of the side walls of the grooves 32. These ribs are received by notches 35 in the side of U shaped laminations 36 which inclose the ends of the bar magnets at one end of the inductor. These laminations are formed of soft iron or steel to increase the permeability of this portion of the magnetic circuit. In order to hold the bar magnets securely onto the core member I provide a pair of cover plates 37 which are U shaped in cross section and provided with grooves 38. The lower sides of the cover members are very slightly tapering so that when they are driven in place above the bar magnets they exert a clamping action upon the same. Furthermore, when the cover members are forced into place one end of the same engages with the laminations 36 and tends to force them against the cap 39 which is secured to the adjacent end of the core by means of screws, not shown, which are received in the openings 40 and 41 of the cap and core respectively, thereby preventing any longitudinal displacement of the laminations. The opposite end of the core member is provided with lugs 42 of the same width as the bar magnets. These lugs and the projecting ends of the bar magnets are received in a transverse groove 43 in the head 44. The head 44 is secured to the core member by means of screws, not shown, which are received by the openings 45 in the head and engage with the threads of the openings 46 in the core. The cap and head are provided with trunnions 47 and 48 respectively, which are journaled in ball bearings 49 and 50 respectively (see Fig. 1), at opposite ends of the casing, the bearing 50 being supported in the end plate 23 through an opening in which the trunnion 48 extends in order to be connected with the driving means.

Laminated pole pieces are preferably molded into the casing which is cast. The pole pieces are provided with circular recesses for receiving the cylindrical walls of the core and the laminations 36. The upper ends of the pole pieces are provided with alined notches which receive the ends of the laminated yoke 55. The ends of the yoke 55 fit snugly within the notches so as to decrease the reluctance of the joints between the field pieces and the ends of the yoke as far as possible. This yoke forms a portion of what might be termed the generating unit of my magneto. As shown in Fig. 1, the yoke is surrounded by a sleeve of insulating material 56 upon which is wound a primary and a secondary coil 57 and 58 respectively, the secondary coil preferably being placed around the primary coil, although it is to be understood that the primary coil may be upon the outside or that the primary and secondary coils may be made in sections and placed side by side. In making this generator coil the primary and secondary coils, as well as the condenser 59, are inclosed in a two piece casing of insulating material, the dividing line between the two portions being indicated at 60 in Fig. 6, which is then sealed together to provide a moisture proof casing for the generating coils. Embedded in the casing at each end of the top side thereof is a terminal member 61 (see Fig. 6) having three upstanding lugs 62, 62' and 62'', respectively. The opposite ends of the condenser and primary winding are connected with the lugs 62 and 62' respectively. One end of the secondary winding is also connected to the common terminal shown at the left hand end of Fig. 6. Extending through the wall of the insulating casing for the generating coils is a hollow metal plug 63 to the outer end of which is riveted, or otherwise connected, a spring contact having the oppositely extending arms 64 and 65. The other terminal 66 of the secondary winding extends through the hollow plug 63 in contact therewith, the outer end being soldered or otherwise secured to the plug. A comparatively heavy terminal conductor is connected with the right hand terminal member 61 shown in Fig. 6 and extends toward the end plate 23, upon which is preferably mounted the interrupter contact support. Preferably any quick detachable connection may be here employed whereby the terminal member 61 is connected with the interrupter stationary contact. Another terminal conductor 82 similar to the conductor just described is connected with the lug 62'' of the left hand terminal member in Fig. 6 by means of a conductor 83, although it is to be understood that this terminal conductor may be directly connected with the lug 62″ or any other portion of the terminal member of which the lug 62″ is a part. The opposite end of the terminal conductor 82 is provided with means for connecting it with the timing plate 84 which is the same in all respects to the quick detachable connection provided between the right hand terminal member 61 and the stationary interrupter contact.

Mounted upon the trunnion 48 is a pinion 85 which is secured by means of screws 86 to the end of the head 44. The pinion 85 meshes with a spur gear 87 which is rigidly mounted upon the sleeve 88 (see Fig. 1). The sleeve 88 is rotatably mounted upon a stud shaft 89 which extends through a suitable opening in the end plate 23 in parallel relation with the trunnions 47 and 48. A washer 90 and a split ring 91 prevent inward movement of the sleeve 88 along the shaft 89. Secured to the gear 87 by the pins 92 between the end plate 23 and the said gear is a timing cam 93 having cams on the periphery thereof. The timing plate 84 is rotatably mounted upon an inwardly projecting boss 94′ which projects inwardly from the end plate 23 and is retained thereon by means of a pin 95 which is received by a slot 96 in the flange 97 of the timing plate. An interrupter lever 98 is pivotally mounted at one end upon the timing plate 84, the pivot being formed by a pin which is riveted to the timing plate and which forms a journal for a sleeve which is secured to the end of the interrupter lever. An adjustable contact is provided on the lever 98 and engages a similar but stationary contact on the interrupter support. The lever 98 is, of course, actuated by the cams on the timing cam 93 whereby the stationary contact and the movable contact are separated in the usual manner to interrupt the primary circuit. The interrupter is urged to its closed position by means of a spring 107 in any well-known manner.

The timing lever 108 (see Fig. 1) is rigidly connected to the timing plate 84 by pins (not shown) which extend through slots (not shown) in the end plate 23. By this arrangement when the timing lever 108 is oscillated the timing plate 84 is likewise oscillated about its pivot point to either advance or retard the firing. The timing lever 108 is rotatably mounted upon the shank of the screw 111 which is threaded into the outer end of the shaft 89. The shaft 89 is hollow and communicates with an oil duct 112 through a port 113, the cover 24 being provided with an oil duct 114 which forms a continuation of the duct 112 in the end plate 23 and is provided with a suitable hinged cover 115. A wick 116, which extends through the wall of the hollow shaft 89, conveys the oil from the interior of the shaft to the exterior thereof. An oil duct 116′ also leads from one end of the sleeve 88 to the ball bearings 50 whereby the oil dripping from the end of this sleeve is used for lubricating the said ball bearings. The ball bearings at the opposite end of the casing are lubricated by means of a duct 117 that is provided with a closure 118 hinged to the casing. A sleeve 119 surrounds the inner end of the sleeve 88 and is provided with a flange 120 which is secured to the inner side of the gear 87 by means of screws 121. This flange is provided with openings 122 into which projecting bosses 123 of the distributer spool 124 are formed when the distributing spool is molded, this spool being made of suitable insulating material. Extending longitudinally through the center of the distributer spool 124 is a metal rod 125, one end of which extends beyond the inner end of the distributer spool and contacts with the spring contact 65, which, as described above, is connected with one terminal of the secondary winding. The distributer spool 124 is provided with a plurality of annular grooves 126 at the bottoms of which are located contacts 127 which are connected with the rod 125 by means of conductors 128. The contacts 127 are successively spaced 90° from each other, inasmuch as this magneto is intended to supply the current to a four cylinder engine. In the event that the number of cylinders is greater or less than four this spacing will be correspondingly decreased or increased.

The brushes 129 are slidably mounted in sleeves 130 and held against the bottoms of the grooves 126 by means of springs 131. The sleeves 130 are embedded in a distributer block 132 of insulating material which is carried by the cover 24. A strip of felt 133 is inserted between the block 132 and the cover 24 to hold the distributer block firmly in place. Each of the sleeves 130 is connected by means of a conductor 135 with a binding post which is embedded in one end of the insulating block 132. These binding posts provide means for connecting the distributer brushes 129 with their respective spark plugs. The cover 24 is provided with a convex concave boss 136 from the inner side of which projects a safety gap electrode 137, which co-acts with a second electrode 138 which is embedded in the distributer block 132 with its lower end projecting through the distributer block and contacting with the spring arm 64 which is connected with one terminal of the secondary, as described above. The electrode 137 being connected with the grounded terminal of the secondary and the electrode 138 being connected with the opposite terminal thereof the gap between these two electrodes provides a safety spark gap. A bar 139 extends between the upper edges of the side walls of the casing and is provided with a pin 140 which is received in a depression in the lower side of the block 132, and a similar pin 140' is carried by the opposite end of the casing and likewise co-acts with a depression in the lower side of the block 132 to center the block and the cover relative to the casing.

It is thought that the operation of my magneto will be clear from the above description and it will consequently only be briefly referred to.

When the permanent magnet is positioned so that the laminations 36 are adjacent the pole pieces, that is, when the permanent magnet is at right angles to the position shown in Figs. 1, 2 and 3, the flux passes from the north pole of the magnet through the adjacent pole pieces, through the yoke 55, the opposite pole piece to the adjacent south pole, and then through the head 44 and back to the north pole. As the permanent magnet rotates the lines of force are stretched until just before the magnet reaches the position shown in Figs. 1, 2 and 3 when they are suddenly broken and as the magnet continues to rotate they are again established, but in the reverse direction. The timing cam 93 is geared to the magnet through the pinion 85 and the gear 87 in such a relation that the primary current is interrupted at substantially the same instant that the field flux is broken down and reversed. This change in the direction of the field force induces the maximum possible current in the primary circuit and when this current is interrupted by the separation of the contacts of the circuit breaker it quickly dies away, thereby inducing a very high potential in the secondary winding.

The circuit of the magneto is as follows: From the secondary winding 58 through the spring contact 65 to the rod 125 of the distributer, thence through one of the conductors 128 and distributer contacts 127 to one of the brushes 129 on the distributer block. From this point the current flows through a conductor to its associated spark plug across the spark gap to the engine frame. The casing of the magneto is usually grounded upon the frame of the engine. The timing plate 84 and the interrupter lever 98 are grounded upon the casing of the magneto and since one end of the conductor 82 is connected with the grounding plate the secondary current returns over this conductor to the left hand terminal 61 and from thence to the secondary winding. A switch is generally provided, whereby it is possible to short circuit the primary winding and thereby prevent the magneto from operating.

In the above description it is to be understood of course, that the material from which the casing of the magneto is constructed is to be of brass or some other material having very slight magnetic permeability. The same comment applies to the magnet core 31, the cover plates 37, and the cap 39.

While I have described the preferred embodiment of my invention it is to be understood that it is not limited to the details described, but is capable of other adaptations and modifications within the scope of the following claims.

Having thus described my invention, what I claim as new and desire to secure by Letters Patent of the United States, is:

1. A magnetic inductor comprising a core member provided with a pair of oppositely disposed grooves, ribs formed on the side walls of said grooves, a plurality of bar magnets disposed in each of said grooves, the poles of one set of magnets being of opposite polarity to the poles of the other set, a plurality of U-shaped laminations disposed about one end of each set of magnets and provided with notches for receiving said ribs, U shaped cover plates for said magnets disposed with one end abutting said laminations and having notches for receiving said ribs, a support for the ends of said core and magnets opposite said laminations comprising a head of magnetically permeable material having a groove therein for receiving the ends of said magnets, core, and covers, and a flanged cap for supporting the opposite ends of said magnets and core, the said head and cap being provided with trunnions.

2. A magnetic inductor comprising a core member provided with a pair of oppositely disposed grooves, a bar magnet disposed in each of said grooves, the pole of one magnet being of opposite polarity to the pole of the other, a plurality of U shaped laminations disposed about one end of each magnet, cover plates for said magnets disposed with one end abutting said laminations, means for securing said cover plates and laminations to said magnets, a support for the ends of said core and magnets opposite said laminations comprising a head of magnetically permeable material having a groove therein for receiving the ends of said magnets, core, and covers, and a flanged cap for supporting the opposite ends of said magnets and core, the said head and cap being provided with trunnions.

3. A magnetic inductor comprising a core, a pair of bar magnets disposed on opposite sides of said core respectively with poles of opposite polarity adjacent each other, soft iron laminations secured to one end of said magnets, and a magnetically permeable support for the opposite ends of said magnets and core.

4. A magneto comprising primary and secondary coils, a condenser, an insulating casing inclosing said coils and condenser, and common terminal members for the opposite terminals of said primary coil and condenser embedded in said casing, one terminal of said secondary coil being connected with one of said common terminals.

5. A magnetic inductor comprising a core member provided with a pair of oppositely disposed grooves, a bar magnet in each of said grooves, said magnets being oppositely disposed with respect to their poles, magnetically permeable means carried by the core member connecting the north pole of one bar magnet with the south pole of the other, ribs formed in the side walls of said grooves and a plurality of U-shaped laminæ disposed about one end of each bar magnet and provided with notches for receiving said ribs.

6. A magnetic inductor comprising a core member provided with a pair of oppositely disposed grooves, a bar magnet in each of said grooves, said magnets being oppositely disposed with respect to their poles, magnetically permeable means carried by the core member connecting the north pole of one bar magnet with the south pole of the other, ribs formed in the side walls of said grooves and a plurality of U-shaped laminæ disposed about one end of each bar magnet and provided with notches for receiving said ribs together with U-shaped cover plates for said bar magnets, each cover plate disposed with one end abutting said laminæ, said cover plates having notches for receiving the aforesaid ribs.

7. A magnetic inductor for a machine of the class described comprising a cylindrical core, said core being provided with a pair of oppositely disposed and parallel grooves, longitudinal ribs on the side walls of said grooves, permanent bar magnets carried in said grooves, said bar magnets being oppositely disposed with respect to their poles, a magnetically permeable yoke carried at one end of said core connecting the north pole of one bar magnet with the south pole of the other and a plurality of U-shaped laminæ embracing said bar magnets near the other end of said core, said U-shaped laminæ provided with notches adapted to receive said ribs, together with means for mounting said core for movement around an axis parallel with said bar magnets.

8. A magnetic inductor for a machine of the class described comprising a cylindrical core, said core being provided with a pair of oppositely disposed and parallel grooves, permanent bar magnets in said grooves, said bar magnets being oppositely disposed with respect to their poles, a magnetically permeable yoke carried at one end of said core connecting the north pole of one magnet with the south pole of the other and a plurality of U-shaped laminæ embracing said bar magnets near the other end of said core, together with means for mounting said core for movement around an axis parallel with said bar magnets.

9. A magnetic inductor for a machine of the class described comprising a cylindrical core, said core being provided with a pair of oppositely disposed and parallel grooves, longitudinal ribs on the side walls of said grooves, permanent bar magnets in said grooves, said bar magnets being oppositely disposed with respect to their poles, a magnetically permeable yoke carried at one end of said core connecting the north pole of one magnet with the south pole of the other and a plurality of U-shaped laminæ embracing said bar magnets near the other end of said core, U-shaped cover plates for said bar magnets provided with grooves adapted to receive said ribs, together with means for mounting said core for movement around an axis parallel with said bar magnets.

10. A magnetic inductor for a machine of the class described comprising a yoke of magnetically permeable material, a cap of non-magnetic material, co-axial trunnions carried by said yoke and cap, a cylindrical core mounted between said yoke and cap, said core being provided with oppositely disposed and parallel grooves in the periphery thereof, permanent bar magnets disposed in said grooves with the north pole of one and the south pole of the other in contact with said yoke and means for retaining said bar magnets in said grooves.

11. A magnetic inductor for a machine of the class described comprising a yoke of magnetically permeable material, a cap of non-magnetic material, co-axial trunnions carried by said yoke and cap, a cylindrical core mounted between said yoke and cap, said core being provided with oppositely disposed and parallel grooves in the periphery thereof, permanent bar magnets disposed in said grooves with the north pole of one and the south pole of the other in contact with said yoke, longitudinal ribs formed on the side walls of said grooves and means for retaining said bar magnets in said grooves comprising U-shaped cover plates provided with grooves adapted to receive said ribs.

12. An inductor for a machine of the class described comprising a cylindrical core having a pair of oppositely disposed and parallel grooves formed in its periphery, permanent bar magnets disposed in said grooves, said bar magnets being oppositely disposed with respect to their poles, a magnetically permeable yoke carried with said core connecting the north pole of one bar magnet to the south pole of the other and means for retaining said bar magnets in said grooves, comprising U-shaped cover plates embracing said bar magnets and having tongue and groove connection with the side walls of the grooves in which said bar magnets are disposed.

13. An inductor for a machine of the class described, comprising a cylindrical core having a pair of oppositely disposed and parallel grooves formed in its periphery, permanent bar magnets disposed in said grooves, said bar magnets being oppositely disposed with respect to their poles, a magnetically permeable yoke carried with said core, connecting the north pole of one bar magnet with the south pole of the other, together with a plurality of U-shaped laminæ embracing the ends of said bar magnets which lie away from said yoke, said U-shaped laminæ having tongue and groove connection with the side walls of the grooves in which said bar magnets are disposed.

14. An inductor for a machine of the class described comprising a cylindrical core, said core being provided with oppositely disposed and parallel grooves, a yoke of magnetic material secured to one end of said core, a cap of non-magnetic material secured to the opposite end of said core, co-axial trunnions carried by said yoke and cap, a bar magnet disposed in each of said grooves and means for retaining said bar magnets in said grooves with the north pole of one and the south pole of the other in contact with said yoke.

In witness whereof, I hereunto subscribe my name this 28th day of November, 1917.

JOHN ROY STARK.

Witnesses:
WALTER BROWN,
ARTHUR KLECKNER.